United States Patent [19]

Stemmle et al.

[11] Patent Number: 5,162,916
[45] Date of Patent: Nov. 10, 1992

[54] COMPACT READ/WRITE SCANNER

[75] Inventors: Denis J. Stemmle; Robert Robideau, both of Webster, N.Y.

[73] Assignee: Xerox Corporation, Stamford, Conn.

[21] Appl. No.: 547,264

[22] Filed: Jul. 2, 1990

[51] Int. Cl.⁵ .................... H04N 1/028; H04N 1/032; H04N 1/10; H04N 1/23
[52] U.S. Cl. .................... 358/296; 358/472; 358/497; 358/498
[58] Field of Search ............... 358/296, 300, 302, 401, 358/472, 473, 476, 494, 496, 497, 498, 482, 483; 346/143; 382/59

[56] References Cited

U.S. PATENT DOCUMENTS

| | | | |
|---|---|---|---|
| 4,319,283 | 3/1982 | Ozawa et al. | 358/296 |
| 4,424,524 | 1/1984 | Daniele | 358/401 |
| 4,466,020 | 8/1984 | O'Connell | 358/300 |
| 4,476,496 | 10/1984 | Thaler | 358/296 |
| 4,496,984 | 1/1985 | Stoffel | 358/296 |
| 4,574,317 | 3/1986 | Scheible | 358/296 |
| 4,583,126 | 4/1986 | Stoffel | 358/401 |
| 4,609,946 | 9/1986 | Thaler | 358/296 |
| 4,635,130 | 1/1987 | Oi | 358/296 |
| 4,636,871 | 1/1987 | Oi | 358/296 |
| 4,649,437 | 3/1987 | Watanabe . | |
| 4,707,747 | 11/1987 | Rockwell | 358/473 |
| 4,724,490 | 2/1988 | Tanioka | 358/296 |
| 4,794,463 | 12/1988 | Tamura | 358/296 |
| 4,802,014 | 1/1989 | Kega | 358/296 |
| 4,823,195 | 4/1989 | Ito | 358/296 |
| 4,905,090 | 2/1990 | Miyake | 358/296 |
| 4,920,421 | 4/1990 | Stemmle | 358/296 |

Primary Examiner—Benjamin R. Fuller
Assistant Examiner—Scott A. Rogers

[57] ABSTRACT

Combined input scanner and output scanner has a scanning carriage adapted for scanning movement having a reading head secured thereto for scanning a document to produce a digital image and a printing head secured thereto for relative movement with respect to a copy sheet and electrically connected to the reading head for printing a digital image on a copy sheet. The reading head includes a solid state device with input reading elements and the printing head includes a solid state device with output printing elements which are securely comounted in the same plane to the same planar substrate.

28 Claims, 6 Drawing Sheets

COMPACT READ/WRITE SCANNER

Attention is directed to my copending application Ser. No. 07/257,366 entitled Simultaneous Read/Write Copier filed Oct. 13, 1988, now U.S. Pat. No. 4,920,421 issued Apr. 24, 1990. Attention is also directed to copending application Ser. No. 07/547,887 entitled Compact Multimode Input and Output Scanner; Ser. No. 07/547,275 entitled Platen Accessory For Portable Copier; and Ser. No. 07/547,272 entitled Scanner with Document and Copy Sheet Registration Means; all filed concurrently herewith and commonly assigned.

BACKGROUND OF THE INVENTION

The present invention relates to a very low cost portable compact scanner. More particularly it is directed to a compact device employing a single scanning carriage having a reading head and a printing head securely comounted in the same plane to a planar mounting substrate.

Historically, copies of original documents have been produced by a xerographic process wherein the original document to be copied is placed on a transparent platen, either by hand or automatically through the use of a document handler, and the original document illuminated by a relatively high intensity light. Image rays reflected from the illuminated document are focused by a suitable optical system onto a previously charged photoconductor, the image light rays functioning to discharge the photoconductor in accordance with the image content of the original to produce an electrostatic latent image of the original on the photoconductor. The electrostatic latent image so produced is thereafter developed by a suitable developer material commonly referred to as toner, and the developed image transferred to a sheet of copy paper brought forward by a suitable feeder. The transferred image is thereafter fixed to the copy paper by fusing to provide a permanent copy while the photoconductor is cleaned of residual developer preparatory to recharging. More recently, interest has arisen in electronic imaging where, in contrast to the aforedescribed xerographic system, the image of the document original is converted to electrical signals or pixels and these signals, which may be processed, transmitted over long distances, and/or stored, are used to produce one or more copies. In such an electronic imaging system, rather than focusing the light image onto a photoreceptor for purposes of discharging a charged surface prior to xerographic development, the optical system focuses the image rays reflected from the document original onto the image reading array which serves to convert the image rays to electrical signals. These signals are used to create an image by some means such as operating a laser beam to discharge a xerographic photoreceptor, or by operating some direct marking system such as an ink jet, direct thermal or thermal transfer printing system.

It is generally advantageous if the normally separate document reading and copy printing operations could be combined. If some of these reading/writing functions could be combined, system operation and synchronization could be simplified and system cost reduced through the use of fewer parts.

There are systems in the prior art that address the above identified concerns. For example:

U.S. Pat. No. 4,496,984 to Stoffel and U.S. Pat. No. 4,583,126, a division of the above-identified reference, disclose an input/output scanner for simultaneously reading a document and writing a copy. The document and copy sheet are fed in back to back relation to the read/write station. A monolithic full width reading array reads each line in two steps, to improve resolution. The writing array consists of rows of ink jet nozzles, of which the number and disposition is in direct correspondence to the sensors of the read bar.

U.S. Pat. No. 4,424,524 to Daniele discloses a full width read/write LED array for scanning a document in the read mode or exposing the photoreceptor in the write mode. A Selfoc optical fiber lens array is used for focusing the full width LED array on the document and the frame assembly includes copy sheet and document or photoreceptor transport paths including means to index a document to the document path in a direction transverse to the first direction, and to index a copy sheet through the copy sheet path, in the opposite transverse direction of indexing said document.

U.S. Pat. No. 4,636,871 to Oi discloses a copying machine comprising separate reading and printing arrays and a scanning mechanism for moving the subject copy. A relative movement between the copying paper sheet and print element and between the document and read element is effected so that scanning is performed in the same pattern on both the reading and printing sides.

A difficulty with these prior art systems is the complexity and cost of separate components such as the complex optics, photoreceptor and developer in a typical xerographic process such as the Daniele system. In other systems such as the Stoffel system, it is necessary for an operator to manually combine a document and copy sheet into a single unit for manual insertion to the machine feed rolls. Such a system also has a significant cost penalty associated with components such as the monolithic full width reading array.

In the scanning carriage described in the above referenced copending application entitled Compact Multimode Input and Output Scanner, the input chip was mounted on a facet of the scanned print carriage which was remote from the surface on which the ink jet chip was mounted. While this is a workable arrangement, the control of the tolerances on the mounting of the input chip relative to the output chip and the mounting of both chips relative to the copy paper and the document is somewhat challenging in that each chip has very tight alignment tolerances in six dimensions, the X,Y,Z, axes and 3 rotational degrees of freedom, one about each axis. It is, for example, desired that the line of photo sights in the input chip be aligned in all six dimensions with the lines of sights on the ink jet chip to minimize pixel placement error. Any lack of true parallelism between the line of image receiving pixels on the input device and the image creating pixels on the print head device will result in image discontinuities or pixel placement errors between bands of images on the created copy. Accordingly, it is an object of the present invention to provide a scanner which minimizes these discontinuities.

PRIOR ART

U.S. Pat. No. 4,574,317 to Scheible discloses a hand scannable portable copier and method which uses a LED array and a thermal print head array which are co-planar with respect to each other. See column 2, lines 50–54. The copier uses a transparent copy sheet in order that a document and the copy sheet may be placed on top of one another. See column 2, lines 45–50.

The apparatus allows a small band of information to be copied.

U.S. Pat. No. 4,707,747 to Rockwell, discloses a hand held scanning device in which a LED array and several chips are mounted on the same substrate. See column 4, lines 10-12. The device is solely intended for scanning purposes.

SUMMARY OF THE INVENTION

In a principle aspect of the present invention, a combined input scanner and output scanner having a scanning carriage with a reading head for scanning a document to produce a digital image and a printing head for relative movement with respect to a copy sheet which is electronically connected to the reading head for printing digital image on a copy sheet is provided. The reading head includes a solid state device with input reading elements and the printing head includes a solid state device with output printing elements which are securely comounted in the same plane to the same planar substrate solid state devices in the scanning carriage.

In a further aspect of the present invention the scanning carriage moves between an image plane and a printing plane parallel to the image plane and the planar mounting substrate is perpendicular to both the image plane and the printing plane.

In the further aspect of the present invention, the substrate is ceramic.

In the further aspect of the present invention, the input device and output device are comounted in a vertical plane.

In the further aspect of the present invention, the input device and output device are comounted in a horizontal array in a vertical plane.

In a further aspect of the present invention, the output chip is a thermal ink jet array, a direct thermal print head or a thermal transfer head.

In a further aspect of the present invention, a control chip which may be part of the input chip is also comounted to the planar substrate.

In the further aspect of the present invention, the carriage is movably mounted in a frame assembly for scanning movement in a scanning path in a first direction across the length of the frame assembly, and the frame assembly includes copy sheet and document transport paths including means to index a document to the document path in a direction transverse to the first direction, and to index a copy sheet through the copy sheet path, in the opposite transverse direction of indexing said document.

In a further aspect of the present invention, the reading and writing occur essentially simultaneously without information storage.

In a further aspect of the present invention, the scanning carriage is mounted for bi-directional movement in the frame assembly.

BRIEF DESCRIPTION OF THE DRAWINGS

For a better understanding of the present invention reference is had to the accompanied drawings wherein the reference numerals have been applied to the same parts in several figures.

DESCRIPTION OF PREFERRED EMBODIMENT

Figure 6A:
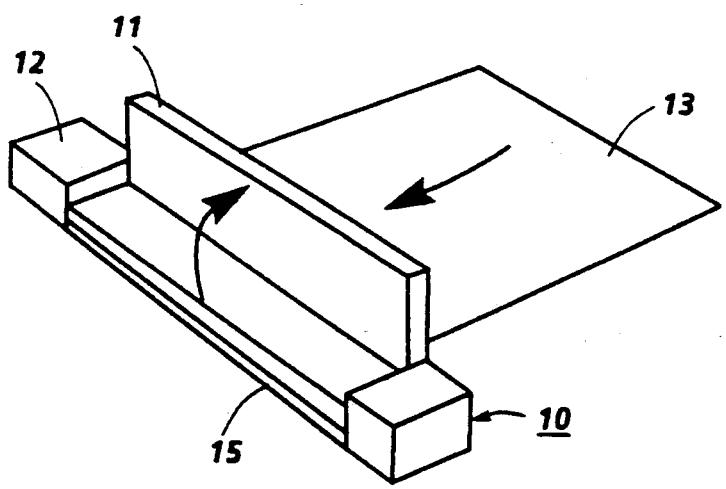
FIGS. 6A, 6B, and 6C are three isometric views illustrating the general operation of the compact copier.
Figure 6B:
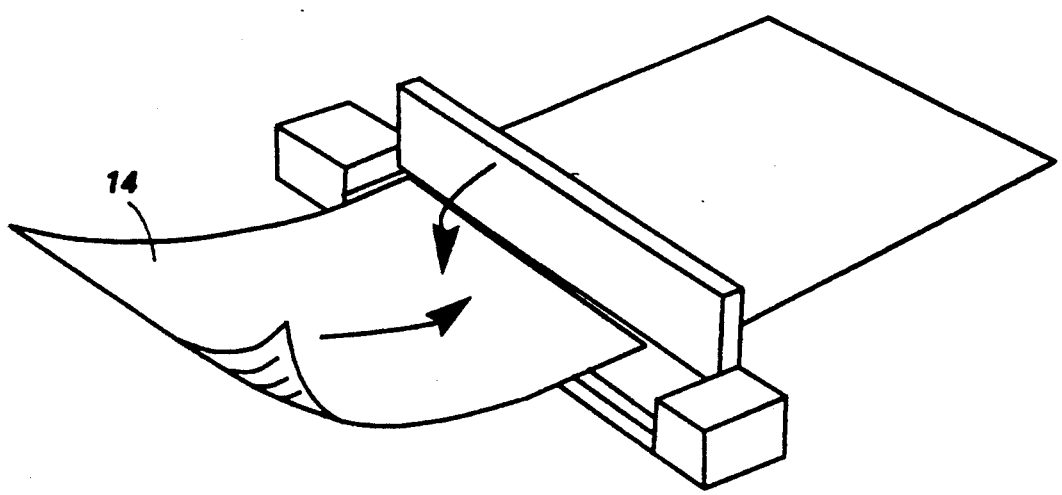
Figure 6C:
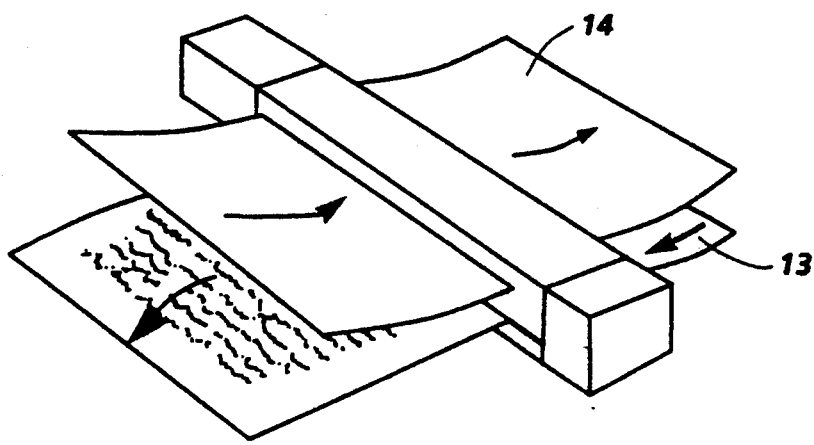

Referring now to FIGS. 6A, 6B and 6C a general overview of the compact portable copier according to the present invention is provided. The copier is generally illustrated as comprising a frame assembly 15 having a maintenance station 12 at one end and a top cover 11 pivotally mounted to the frame assembly. To make a copy of document 14 the top cover is rotated to the open position as shown in FIG. 6A, copy sheet 13 is inserted at the entrance of the copy sheet transport path and the document 14 is inserted against a registration stop member in the top cover after which the top cover is closed and the copying sequence begins by the scanning carriage scanning a band of information across the document. During the scanning operation the image on the document is digitized by an input digitizing system and in the preferred embodiment a digital image is essentially simultaneously printed by a printing system on the copy sheet. Subsequently, the document is indexed to the right and the copy sheet is indexed to the left to enable the scanning carriage to scan a second band of information in the reverse scanning direction across the document. The distance of the indexing of both the document and copy sheet is the width of the band of information across the document.

Referring to FIGS. 1, 2, 4 and 8 of the drawings there is shown a combined input scanner and output scanner designated generally by reference numeral 10. The scanner 10 includes a frame assembly 15 composed of a base unit 18, rails 19 within which scanning carriage 20 is transported during its scanning path. When not in scanning operation the scanning carriage 20 is parked in the maintenance station 12 where it is protected from contamination and maintained in a relatively constant environment. The scanning carriage 20 includes an array of light emitting diodes 21 mounted to substrate 52 which is typically ceramic or planar plastic, and has a heat sink 54 built into its rear portion. Input and control chip 26 and ink jet chip 27 are comounted in the same plane to the same planar substrate 52. During operation the scanning carriage scans a document which is in an image plane and prints on the copy sheet which is in the printing plane parallel to the image plane. The planar substrate to which the input chip and output chip are comounted is perpendicular to both the image plane and the printing plane. Power is provided to the substrate by connector 53. The chip substrate is mounted to the scanning carriage 20 by means of docking pins 56 cooperating with docking holes 57. When assembled, the document can be scanned with the image being reflected by mirror 22 through half-lens 23 back to the input and the control chip 26 which can essentially simultaneously activate the ink jet chip 27. This arrangement enables the input chip and the ink jet chip to be mounted on the same planar substrate, thereby substantially reducing mechanical tolerance requirements. This configuration also enables the input chip and ink jet chip and possibly all control chips to be combined into a single chip. The substrate may be made of any suitable planar material. Typical materials include and ceramics such as alumina which are mechanically stable with good heat transfer and thermal expansion properties. This assembly scans or reads document originals 14 the image area being converted to electric image signals or pixels. The image signals generated by the reading head are input to a print bar 25 which may be any suitable direct imaging device such as a thermal transfer head or preferably a thermal ink jet array 27 to write copies of the document originals in accordance with the image signals onto a suitable substrate or copy sheet 13. It will be understood that while reference has been made to input and output chips, ink jet arrays etc. that the present invention is directed in a more generic sense to the mounting of solid state devices with input reading elements and solid state devices with output printing elements. It will be understood that the number of scanning elements or sensors that comprise the image read bar 17 determine the initial scanning resolution while the number of ink jet nozzles 25 that comprise the print bar 25 determine the resolution of the image copy. In a preferred embodiment the number of input scanning elements equals the number of output printing elements. Both the scanning head and the print head are secured for movement on scanning carriage 20 which is mounted for forward and backward bi-directional scanning movement in a scanning path along the length of the frame assembly by means of scan stepper motor 32 through gear 31 pulleys 29 and 30 and cable 28 to move the scanning carriage in the rails 19.

Figure 7:
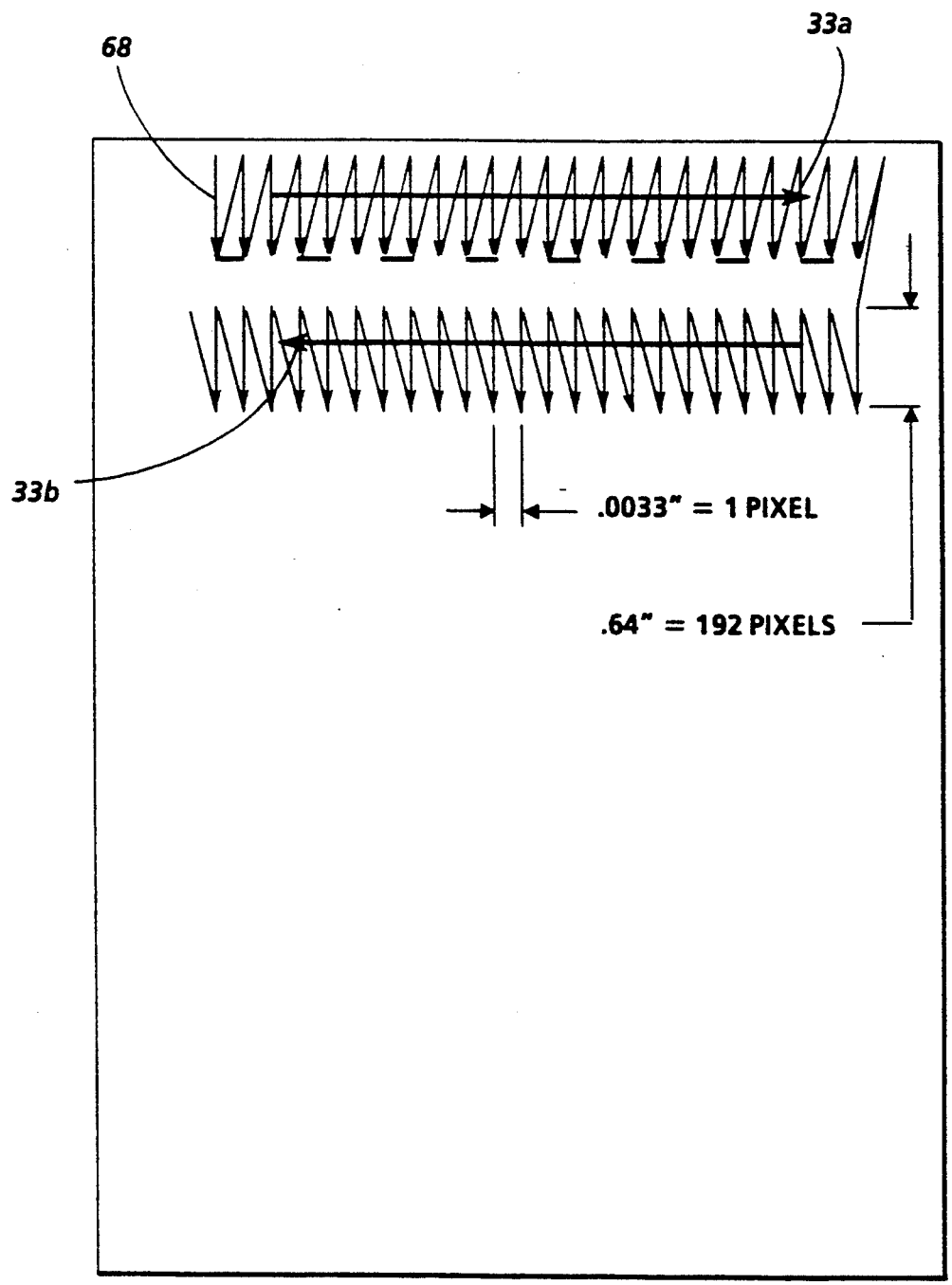
FIG. 7 is an illustration of the scanning operation.
Figure 8:
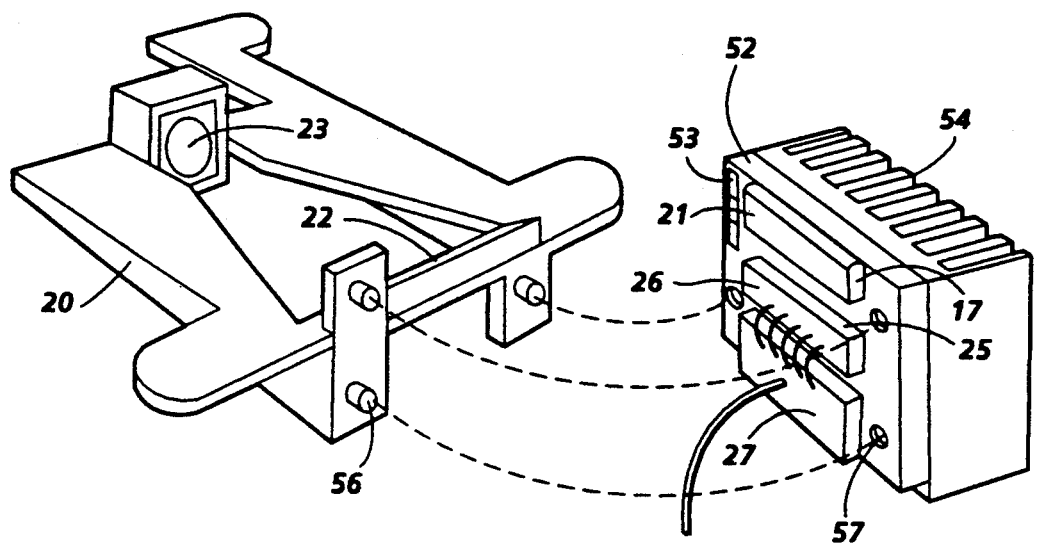
FIG. 8 is an isometric representation of one embodiment of the scanning carriage of the present invention.

The movement of the scan carriage 20 supporting image read assembly 21, 22, 23, 26 and print bar 25 is further illustrated with respect to FIG. 7. Arrows 33a and 33b illustrate the forward and reverse scan of the carriage 20 across a document and copy sheet, also shown in FIG. 2. The arrows 68 illustrate that a number of pixels, perpendicular to the direction of movement of scan carriage 22, are both read by the read assembly and printed by the print bar as the carriage scans the document and copy sheet. In a typical embodiment, 192 pixels at 300 per inch are read and printed perpendicular to the movement of carriage as it scans. In this example arrow 68 represents a band of information 0.0033 inch long and 0.64 inch wide which is read and printed. The movement of the carriage can be continuous or in discrete steps, but in a preferred embodiment, the 192 pixels are read and printed in increments that are one pixel apart as shown. In one embodiment, each time the scan carriage moves a distance of one pixel width across the sheet, the electronic image of 192 pixels down the sheet are moved into a shift register and then amplified and shifted in reverse order into the print bar to fire the 192 ink jets and thereby create a print of the 192 pixels previously read. This sequence is repeated each time the scan carriage has moved a distance of one pixel width. It should be noted that the scanning could also be done with 192 parallel channels, each channel reading and writing a single line of pixels as the carriage sweeps across the page. While it is preferred that the read/write operation be substantially simultaneous it should also be noted that a digital buffer or register could be incorporated to initially store the scanned or read signals for later printing after a predetermined or arbitrary time period. It should also be understood that the combined scanner illustrated has multimode capability and could be operated independently as a printer modulated by any suitable device providing digital information, operated independently as a scanner to convert source documents to a digital representation, or operated as a facsimile device using the reading and printing elements when combined with a suitable modem, or operated as a copier by combining the scanning and printing operations.

Figure 3:
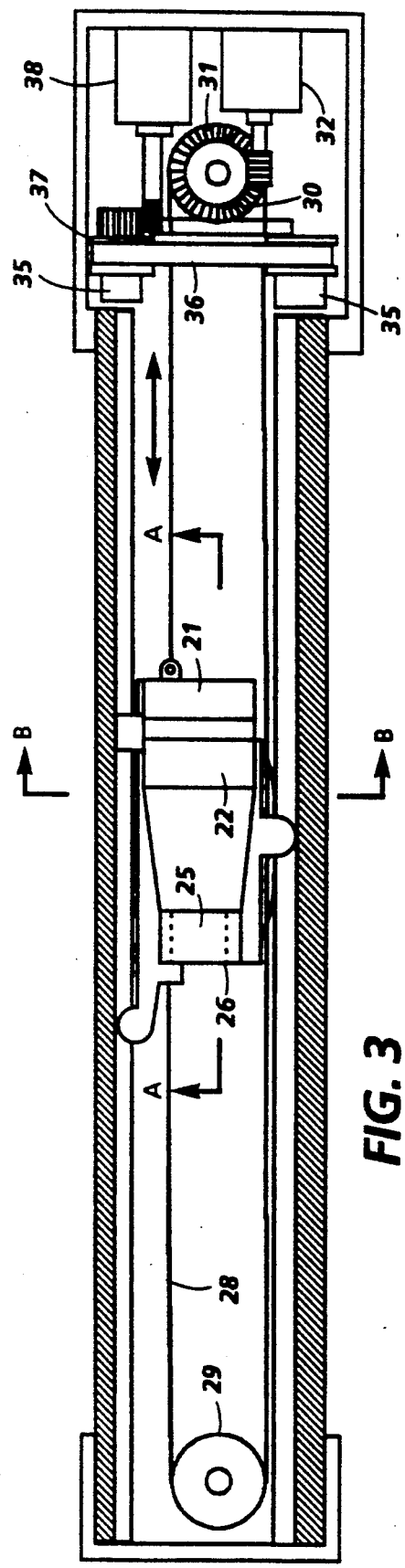
FIG. 3 is a plan view illustrating the scanning carriage system.

Following a scanning run in either direction across the length of the frame assembly the document and copy sheet are each indexed through the scanner in opposite directions a distance equal to the width of the band of information on the document scanned by the reading head which is the same as the width of the band of information printed on the copy sheet by the printing head. This width can be any width from a minimum of a single pixel line to a maximum of the width of the entire document. In practical terms, however, in order to keep the cost of the read and write components low the width of the band is of the order of a fraction of an inch to several inches wide. The method for achieving this is illustrated with further reference to FIGS. 1, 2 and 3, wherein an indexing means is provided at one end of the frame assembly comprising a pair of synchronously driven rotatable drive rolls 35 forming a feeding nip for a document with document feed idler rolls 42 contained within the top cover 11 of the scanner. The term synchronously driven is intended to define only that the drive rolls 35 are synchronized to each other. The drive rolls 35 also form a feeding nip for a copy sheet with the copy sheet idler rolls 46 in the copy sheet with the copy sheet idler roll 46 in the copy sheet transport path. The drive rolls 35 are driven by index motor 38 through pulley gear 37 and belt 36. The scan motor 32 and the index motor 38 are controlled by logic 33 as illustrated in FIG. 4.

Figure 5:
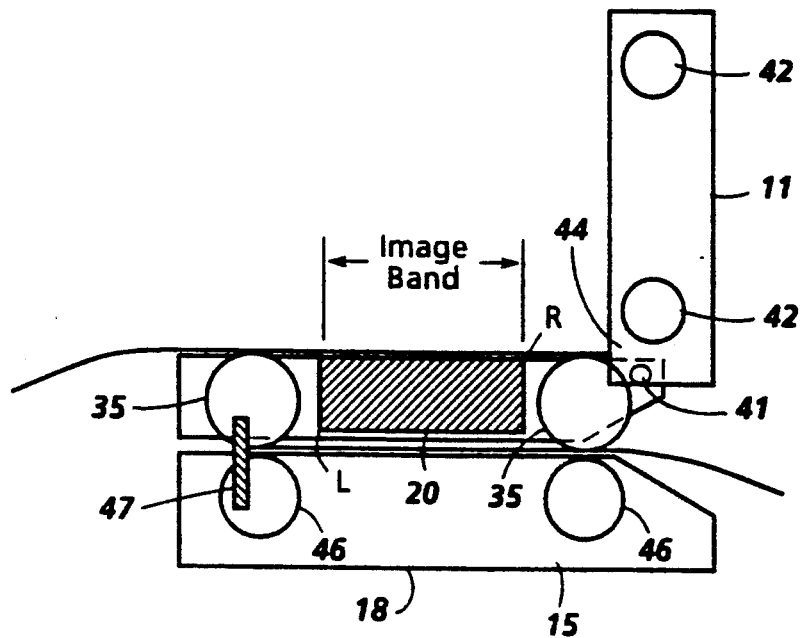
FIG. 5 is a sectional view taken along the line BB in FIG. 3 illustrating the registration mechanism for the document as well as the copy sheet according to the present invention.

With additional reference to FIG. 5, the top cover 11 is pivotally mounted to the frame assembly 15 in particular the base unit 18, and pivots about points 41. When the top cover is pivoted to the open position the document feed idler rolls 42 are disengaged from the drive rolls and the registration edge 44 is inserted into the place of the document transport path enabling the placement of a document to be copied in the scanner with its lead edge registered and inhibiting transport of the document through the document transport path. In a similar manner the first incoming copy sheet idler roll 46 in the base unit is retracted from engagement from the drive roll 35 by linkage (not shown) when the top cover is raised to the open position. Similarly, registration gates 47 are inserted into the copy sheet transport path to enable manual registration of the copy sheet.

In a preferred embodiment the circumference of the drive rolls is equal to a the width of the band of information across the document scanned by the scanning carriage to eliminate run out and shaft straightness tolerance defects which otherwise might cause some misregistration between scan widths.

Figure 1:
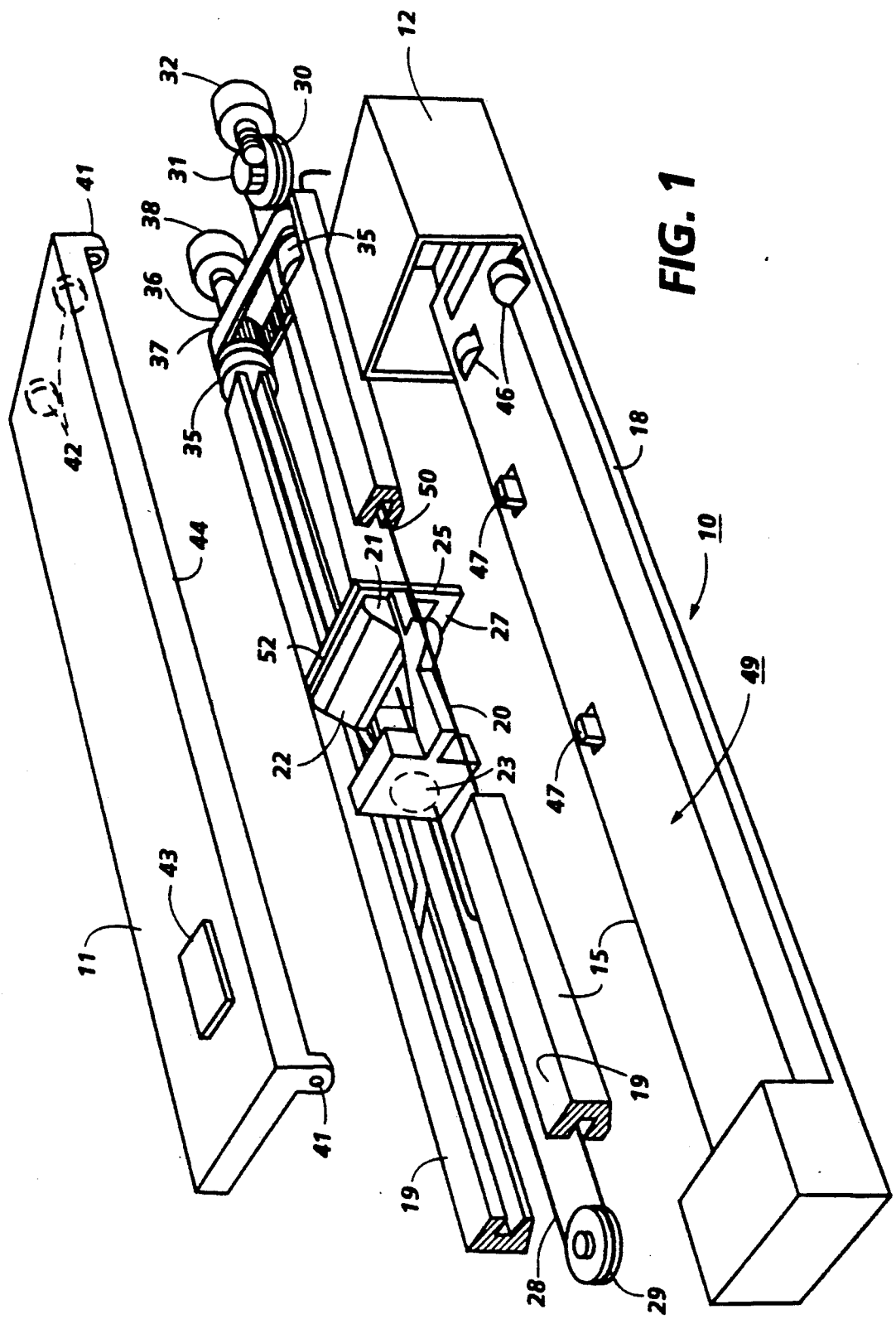
FIG. 1 is an exploded isometric view of the compact copier according to the present invention.
Figure 2:
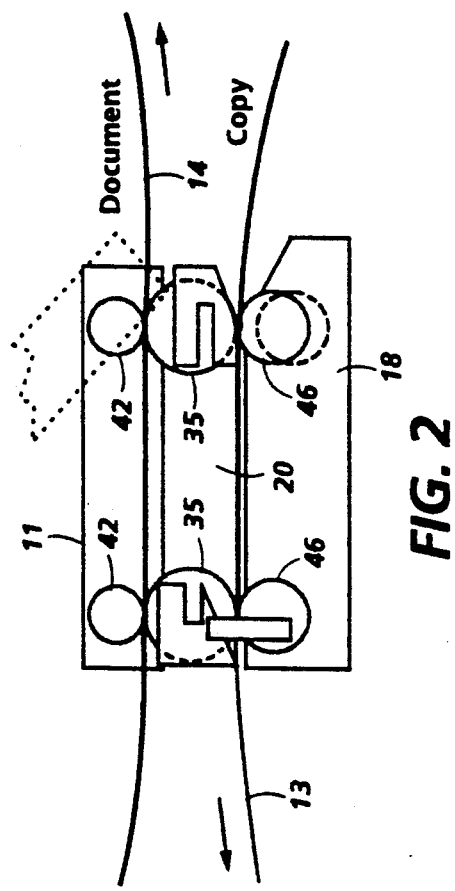
FIG. 2 is a schematic cross sectional view of the compact copier according to the present invention.
Figure 4:
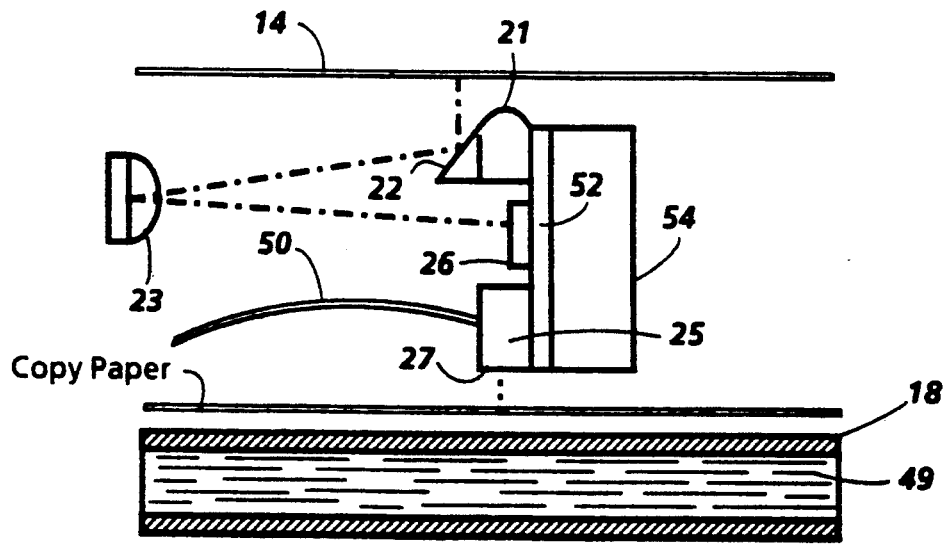
FIG. 4 is a sectional view along the line AA of FIG. 3 illustrating the elements of the scanning carriage in the present invention.

As further illustrated in FIG. 4, the base unit 18 has ink supply 49 connected to the ink jet print head 27 by means of a flexible umbilical ink supply tube 50. While the scanner of the present invention may have power supplied by conventional connection to household electrical circuit FIG. 1 illustrates a preferred embodiment wherein a rechargeable battery 43 is contained within the top.

In operation when the top cover is opened the idler rolls in the document path which are mounted in the top cover are moved out of position enabling placement of the document against front registration edge which is part of the top cover assembly. Opening the top cover also causes the first incoming copy paper idler roller to disengage from its drive roller and a set of registration fingers in the copy paper path to move into the copy paper path. A copy sheet may be inserted from the right until its lead edge contacts the registration finger and a document may be inserted from the left on the top of the scanner face down. Following insertion of the copy sheet and the document the top cover is closed thereby re-engaging both the copy paper and document idler rolls with the drive roll. In addition, the copy paper registration fingers are withdrawn, two sensors (not illustrated) detect that both the document and the copy paper have been loaded accordingly and the logic initiates the copying sequence. The scan carriage containing the read and write head disengages from the maintenance station and scans across the document and copy sheet while both remain stationary. The document is positioned so that its lead edge coincides with the right side pixel of the read head, and the copy paper is positioned so that its lead edge coincides with the left side pixel of the print head. This enables the formation of a right reading image on the copy sheet. A line of information on the document read on the right extreme of the image read head fires the print head on the extreme left of the printing array during the scan of the carriage 20. This may be illustrated with reference to FIG. 5. The pixel data received by the input chip at the extreme right of the chip (R); as the carriage 20 moves in the direction into and out of the paper is transmitted and amplified to modulate the print head to fire the print head at the extreme left (L) of the print head. This scheme enables the printing of right reading copies with essentially simultaneous reading and writing without information storage. As the carriage scans across both the document and the copy paper, the 0.64 inches band of information being read off the document is immediately printed onto the copy paper. When the first scan is complete the carriage motion stops. Both the document and copy paper are then indexed in a direction transverse to the scanning direction the width of the band of information previously scanned. This indexing is accomplished by driving the single pair of drive rolls which engage the document at the 12:00 position with the document feed idler rolls forming a feeding nip therebetween, and the copy paper at the 6:00 position with the copy sheet feed idler roll forming a feeding nip therebetween. The clockwise motion of the drive rolls of one revolution causes a document to be indexed 0.64 inches to the right and the copy paper to be indexed 0.64 inches to the left. In this way the second band of information from the document is moved into a position over a scan carriage and a second portion of the copy paper is moved to a position under the print head. The scan carriage scans across the document and copy paper in the reverse direction from the first scan again reading the document and immediately printing the copy. Alternatively, the scan carriage may return to the maintenance station and scan again in the same direction. This sequence is repeated until the entire document is read and the entire copy is printed after which time the print head returns to the maintenance station and is parked.

After the last scan across the document and copy paper is completed, the index motor is activated to eject the trial edge of the document to the right and the copy to the left after which the scanner returns to the dormant state until the top cover is again opened and closed to reinitiate the next copy sequence.

Figure 9:
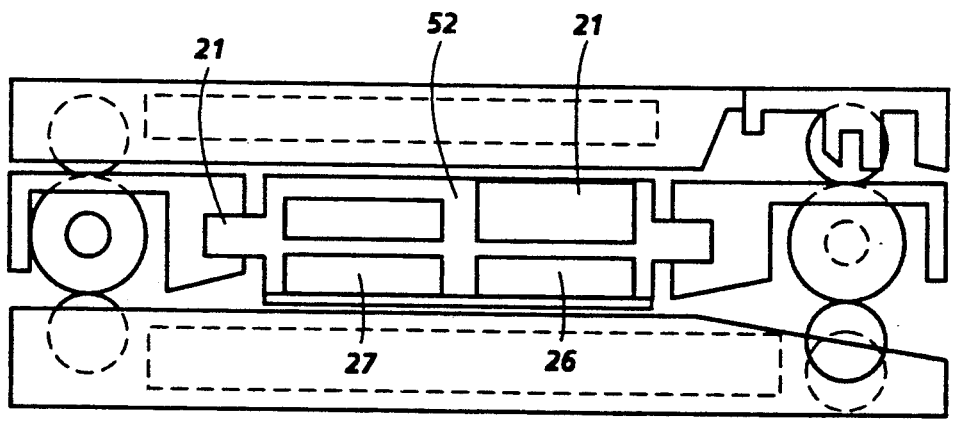
FIG. 9 is a view in cross section illustrating an embodiment wherein the input chip and the output chip are comounted in a horizontal array in a vertical plane.

Attention is directed to FIG. 9 for an alternative embodiment where the input chip 26 and printing chip 27 are comounted in a horizontal array to planar vertical substrate 52 at the front or rear of the scanning carriage as it moves into and out of the Figure.

Thus, according to the present invention, a mounting geometry has been provided which minimizes tolerance requirements in the mounting of the input chip and ink jet chip in a combined input scanner and output scanner. This enables minimizing pixel placement error by enabling the alignment of photo sights in the input chip with the lines of print elements in the output chip by securely comounting the two chips in the same plane to the same planar substrate. It further facilitates all the electronics being mounted to the same planar substrate and indeed enables the mounting of the input chip, the control chip and the ink jet chip directly to the planar substrate thus reducing the number of harnesses, flex cables and connectors required.

All the patents and other references identified herein together with the cross referenced copending applications are hereby specifically and totally incorporated in their entirety into this specification.

While the invention has been described with references specific embodiments thereof it will be apparent to those skilled in the art that many alternatives modifications and variations may be made. For example, while the invention has been illustrated as a copier it is also capable of being operated independently as a printer, scanner or facsimile device. Accordingly it is intended to embrace all such alternatives and modifications as may fall in the spirit of the appended claims.

We claim:

1. A combined input scanner and output scanner comprising a scanning carriage movably mounted in a frame assembly for scanning movement in a scanning path in a first direction across a length of said frame assembly, said frame assembly including copy sheet and document transport paths including means to index a document through said document path in a direction transverse to said first direction and to index a copy sheet through said copy sheet path in an opposite transverse direction of indexing of said document, said scanning carriage having a reading head secured thereto for scanning a document to produce a digital image and a printing head secured thereto for relative movement with respect to a copy sheet and electrically connected to said reading head for printing said digital image on said copy sheet, said scanning carriage including a planar mounting substrate, said reading head including a solid state input device with reading elements and said printing head including a solid state output device with printing elements, said solid state devices being securely comounted in a same plane to the planar mounting substrate and wherein a right side pixel of the read head conincides with a lead edge of a portion of a document to be copied and a left side pixel of the print head coincides with a lead edge of a print of said portion on a copy sheet to form a right reading image on the copy sheet.

2. The scanner of claim 1 wherein said scanning carriage is adapted for scanning movement between an image plane and a printing plane parallel to said image plane and said planar mounting substrate is perpendicular to both of said image plane and printing plane.

3. The scanner of claim 1 wherein said substrate is ceramic.

4. The scanner of claim 1 wherein the input solid state device and output solid state device are comounted in a vertical plane.

5. The scanner of claim 1 wherein said output solid state device is a thermal ink jet array.

6. The scanner of claim 1 wherein said output solid state device is a direct thermal print head.

7. The scanner of claim 1 wherein said output solid state device is a thermal transfer print head.

8. The scanner of claim 1 wherein the input solid state device and output solid state device are comounted in a horizontal array in a vertical plane.

9. The scanner of claim 1 further including a control chip.

10. The scanner of claim 9 wherein the control chip includes the input device combined as a single chip.

11. The scanner of claim 4 wherein said output solid state device is a thermal ink jet array.

12. The scanner of claim 4 wherein said substrate is ceramic.

13. The scanner of claim 4 further including a control chip.

14. The scanner of claim 13 wherein the control chip includes the input device combined as a single chip.

15. The scanner of claim 8 wherein said output solid state device is a thermal ink jet array.

16. The scanner of claim 8 wherein said substrate is ceramic.

17. The scanner of claim 8 further including a control chip.

18. The scanner of claim 17 wherein the control chip includes the input device combined as a single chip.

19. The scanner of claim 1 wherein said reading and printing occur essentially simultaneously without information storage.

20. The scanner of claim 1 wherein said carriage is mounted for bidirectional scanning movement in said frame assembly.

21. The scanner of claim 1 wherein said scanning carriage is movably mounted between a plane of said document transport path and a plane of said copy sheet transport path.

22. The scanner of claim 21 wherein said document transport path is above said copy sheet transport path and said reading head and printing head are comounted on said scanning carriage for essentially simultaneously reading a document face side down in said document transport path and printing a digital image face side up on a copy sheet in said copy sheet transport.

23. The scanner of claim 1 where said indexing means simultaneously indexes a document in said document transport path and a copy sheet in said copy sheet transport path.

24. A combined input scanner and output scanner comprising a scanning carriage movably mounted in a frame assembly for scanning movement in a scanning path in a first direction across a length of said frame assembly, said frame assembly including copy sheet and document transport paths including means to index a document through said document path in a direction transverse to said first direction and to index a copy sheet through said copy sheet path in an opposite transverse direction of indexing of said document, said scanning carriage having a reading head secured thereto for scanning a document to produce a digital image and a printing head secured thereto for relative movement with respect to a copy sheet and electrically connected to said reading head for printing said digital image on said copy sheet, said scanning carriage including a planar mounting substrate, said reading head including a solid state device with input reading elements and said printing head including a solid state device with output printing elements and said solid state devices being securely comounted in a same plane to the planar mounting substrate wherein when said carriage moves in said first direction the reading head scans a band of information across the document and the printing head essentially simultaneously prints the same band of information across a copy sheet and upon completion of said scanning movement said indexing means indexes the document and copy sheet through their respective paths a distance equal to the width of said band of information before said carriage scans another band of information across the document, said indexing means including a first pair of synchronously driven rotatable drive rolls, each drive roll forming a feeding nip for a document with a document feed idler roll and a feeding nip for a copy sheet with a copy sheet feed idler roll, said drive rolls having a circumference equal to the width of the band of information.

25. The scanner of claim 24 wherein a right side pixel of the read head coincides with a lead edge of a portion of a document to be copied and a left side pixel of the print head coincides with a lead edge of a print of said portion on a copy sheet to form a right reading image on the copy sheet.

26. The scanner of claim 24 wherein said scanning carriage is adapted for scanning movement between an image plane and a printing plane parallel to said image plane and said planar mounting substrate is perpendicular to both said image plane and printing plane.

27. The scanner of claim 24 wherein the input solid state device and output solid state device are comounted in a vertical plane.

28. The scanner of claim 24 wherein the input solid state device and output solid state device are comounted in a horizontal array in a vertical plane.

* * * * *